United States Patent
Ender et al.

(10) Patent No.: US 10,936,523 B2
(45) Date of Patent: Mar. 2, 2021

(54) COMMUNICATION MODULE AND LIGHTING BUS SYSTEM HAVING A NETWORK INTERFACE

(71) Applicant: TRIDONIC GMBH & CO KG, Dornbirn (AT)

(72) Inventors: Markus Ender, Altach (AT); Frank Lochmann, Achberg (DE); Dieter Severin, Lustenau (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/642,081

(22) PCT Filed: Aug. 24, 2018

(86) PCT No.: PCT/EP2018/072899
§ 371 (c)(1),
(2) Date: Feb. 26, 2020

(87) PCT Pub. No.: WO2019/042891
PCT Pub. Date: Mar. 7, 2019

(65) Prior Publication Data
US 2020/0183867 A1    Jun. 11, 2020

(30) Foreign Application Priority Data
Aug. 30, 2017    (DE) .................. 10 2017 215 125.0

(51) Int. Cl.
*G06F 13/40* (2006.01)
*H05B 47/18* (2020.01)
(Continued)

(52) U.S. Cl.
CPC ........ *G06F 13/404* (2013.01); *H04L 61/6059* (2013.01); *H04L 67/025* (2013.01); *H04L 69/08* (2013.01); *H05B 47/18* (2020.01)

(58) Field of Classification Search
CPC ... G06F 13/404; H05B 47/18; H04L 61/6059; H04L 67/025; H04L 69/08
See application file for complete search history.

(56) References Cited

U.S. PATENT DOCUMENTS 9,872,366 B2    1/2018    Herter et al.
2009/0119766 A1*    5/2009    Huetter ............. H04L 29/12405
726/12
(Continued)

FOREIGN PATENT DOCUMENTS

| DE | 102005034972 | 1/2007 |
|---|---|---|
| WO | 2016065382 | 5/2016 |

OTHER PUBLICATIONS

Seifried, Stefan et al., "KNX IPv6: Design Issues and Proposed Architecture", May 31, 2017 (Year: 2017).*
(Continued)

*Primary Examiner* — Henry Tsai
*Assistant Examiner* — John B Roche
(74) *Attorney, Agent, or Firm* — Andrus Intellectual Property Law

(57) ABSTRACT

The invention relates to a communication module for connecting a lighting bus system (1) to a network (3) based on an internet protocol, wherein each component (2a . . . 2f) coupled to the bus system (1) is assigned a unique bus address, the communication module (4) is assigned a plurality of network addresses, at least one of the plurality of network addresses contains the bus address of a component (2a . . . 2f) and the communication module (4) is designed to receive data transmitted to the at least one network address from the network (3), to extract the bus address of the component (2a . . . 2f) from the network address, to determine data to be transmitted to the component (2a . . . 2f) by using the extracted bus address on the basis of the received data, and to transmit the determined data to the (Continued)

component (2a . . . 2f) having the extracted bus address via the bus system (1), or to provide the data generated autonomously by a component (2a . . . 2f) and transmitted to the communication module (4) to at least one network subscriber via the network (3).

12 Claims, 5 Drawing Sheets

(51) Int. Cl.
    *H04L 29/12*     (2006.01)
    *H04L 29/08*     (2006.01)
    *H04L 29/06*     (2006.01)

(56) References Cited

U.S. PATENT DOCUMENTS

2015/0115804 A1* 4/2015 Kim .................. H05B 47/175
                                                                               315/152
2015/0208489 A1     7/2015   Dijk et al.
2016/0164831 A1     6/2016   Kim

OTHER PUBLICATIONS

MDT Technologies, "Technical Manual MDT DaliControl IP Gateway DALI16/32.03", May 2013 (Year: 2013).*

German search report dated May 23, 2018 in priority German Application 10 2017 215 125.0.

PCT search report dated Oct. 12, 2018 in parent PCT Application PCT/EP2018/072899.

Technical Manual MDT DahControl IP Gateway DALI16/32.03 downloaded Jan. 27, 2020 (URL: https://www.mdt.de/download/MDT/TM_DaliController_02.pdf).

Seifried, Stefan, et al. "KNX IPy6: Design issues and proposed architecture", 2017 IEEE 13th International Workshop on Factory Communication Systems (WFCS), May 31, 2017, pp. 1-10.

* cited by examiner

COMMUNICATION MODULE AND LIGHTING BUS SYSTEM HAVING A NETWORK INTERFACE

CROSS REFERENCE TO RELATED APPLICATIONS

The present application is the U.S. national stage application of international application PCT/EP2018/072899 filed Aug. 24, 2018, which international application was published on Mar. 7, 2019 as International Publication WO 2019/042891 A1. The international application claims priority to German Patent Application 10 2017 215 125.0 filed Aug. 30, 2017.

FIELD OF THE INVENTION

The present invention relates to a communication module, a lighting bus system, and a method for connecting a lighting bus system to a network based on the internet protocol.

BACKGROUND OF THE INVENTION

In building services engineering, lighting systems may have components, such as sensors, lights, operating devices, actuators, switches, and dimmers, which are connected to one another via a bus system.

In a lighting system according to the DALI industry standard (Digital Addressable Lighting Interface), a randomly generated address can be generated for each component or each bus subscriber, and then a dedicated address for control in the bus system can be generated with the aid of said randomly generated address. Each bus subscriber or each component is addressable with its address in the bus system and may send and receive control commands and/or status information within the bus system.

WO 2016/065382 A1 discloses a bus system to which are coupled a plurality of operating devices and a control unit for controlling the operating devices, wherein the control unit is coupled to an internet protocol-based network and receives from this the control commands for the operating devices.

However, WO 2016/065382 A1 does not disclose how the control commands are associated with the respective operating device, or how the respective bus address is determined, which is necessary for an individual control of the operating devices. In addition, information regarding the current operating status, the configuration or properties of the operating devices, which must be queried from said operating devices via the network, is often necessary for generating control commands.

SUMMARY OF THE INVENTION

The invention is based on the object of specifying devices and methods which alleviate the described problems. In particular, the object is to provide a communication module, a lighting system, and a method with which a connection of a lighting bus system to a network based on an internet protocol for the transmission or querying of data is possible in a simple and cost-effective manner. In this instance, access to the bus system from the network should only be possible with the aid of standard internet protocols such as HTTP or the like, and in fact without knowing the details of the bus system and its operating devices.

This object is achieved according to the features of the independent claims. The invention is developed by the features of the dependent claims.

The invention relates to a communication module for connecting a lighting bus system to a network based on an internet protocol, wherein one or more components are coupled to the bus system; a unique bus address is associated with each component coupled to the bus system; at least one property of at least one component that can be queried in the bus system represents a network-accessible resource; a plurality of network addresses is associated with the communication module; at least one of the plurality of network addresses contains the bus address of a component; and the communication module is designed to receive data transmitted to the at least one network address from the network, to extract the bus address of the component from the network address, to determine data to be transmitted to the component by using the extracted bus address on the basis of the resource and/or the received data, and to transmit the determined data to the component having the extracted bus address via the bus system, or to provide the data generated autonomously by a component and transmitted to the communication module to at least one network subscriber via the network.

According to the present invention, a unique bus address (component ID) is associated with each component coupled to the bus system, and a plurality of network addresses is associated with the communication module, wherein at least one of the plurality of network addresses contains the bus address (component ID) of a component, and the communication module is designed to receive data sent to the at least one network address from the network, to extract the bus address of the component from the network address, to determine data to be transmitted to the component by using the extracted bus address on the basis of the received data (resource path of the URL) and to convert said data into data or commands, and, via the bus system, to transmit these converted and determined data to the component having the extracted bus address.

It is thus a simple matter to associate the data received from the network with a component of the bus system. It is not necessary to determine the bus address based on, for example, the type of control command or the query. This offers the advantage that the specific properties of the bus system do not need to be known for a query.

Alternatively or additionally, the communication module may be designed to provide the data (control commands, status messages) autonomously generated by a component and sent to the communication module to at least one network subscriber via the network. The transmission of the data (control commands, status messages) to the network subscriber may take place immediately after the receipt of this data in the communication module or at the request of the network subscriber. For this purpose, the network subscriber may inform the communication module of the network address to which the data are to be transmitted. For example, this may be communicated once upon installation, for example via the network, or be determined on the basis of a query. This may take place via a special "Callback URL" resource, which is present for all components that can autonomously send data. Additionally or alternatively, the network subscriber may determine the network address of the network subscriber from the data received by the network subscriber, or by means of a table which associates at least one network address of a network subscriber with the bus address of the component and/or with the control command/status message.

The components coupled to the bus may be sensors, lights, operating devices, actuators, switches, and/or dimmers which transmit control and/or status information via the bus.

The communication module may be designed to extract the address of the component from the interface identifier of the network address based on Internet Protocol Version 6, wherein the bus address may be inserted at a specific location in the network address known to the communication module, or be marked by certain characters in the network address.

In the bus system, a plurality of components may be addressable by means of a group bus address, wherein the communication module is designed to determine the group bus address on the basis of a multicast address contained in the network address, and to implement a data transmission to the components belonging to the determined group bus address on the basis of the received data.

The communication module may be designed to automatically recognize the operating devices on the bus system. The services provided by the operating devices are translated into network resources with the aid of a translation table stored in the data memory. This also takes place automatically. These resources may be addressed via the computer network in order to query data from the operating devices or to send commands to devices in order to thus change the configuration of said devices. The operating devices can thus be accessed transparently without specific commands needing to be known. The connected bus system is thus also completely irrelevant for an access from the computer network.

The communication module is designed in such a way that information about the provided resources may be queried via a "generally known address." Via this path, an external device may without prior knowledge determine all information about the bus system and the connected operating devices. This information is made available as hierarchically organized resource paths, wherein the data type for each resource may also be queried.

For example, a plurality of operating devices are connected to the bus system and have received a specific bus address. The operating device scans the bus system and determines the types and addresses of the connected operating devices. The bus address in the bus system is translated into an IPv6 address. The services provided by the operating devices are then determined with the aid of the information stored in the data memory. These are translated into resource paths, e.g. /Settings/Color. The network address/resource path combination thus forms the URL via which a service of an operating device may be used.

Alternatively or additionally, the communication module may be designed to determine a control command from the received data, and to transmit the determined control command to the component with the extracted bus address or the components with the determined group bus address. The control command may be included in the resource path of the URL or network address, or in another portion of the received data, and may be an on, off, dimming, position, or configuration command. In this way, it is possible to remotely control a lamp or rolling shutter with, for example, a mobile control unit (which may also be a smartphone) connected to the network.

Alternatively or additionally, the communication module may be designed to perform a conversion of the data packet format of the received data into the data packet format of the bus system as a transparent gateway, at least from the viewpoint of the network. This allows a plurality of bus systems, each comprising a communication module, to be connected via the network.

Alternatively or additionally, at least one property of at least one component that can be queried in the bus system may represent a resource accessible via the network, which resource can be reached via a URL, wherein the communication module is designed to determine if the received data contain a request (with a Hypertext Transmission Protocol HTTP or another protocol, such as CoAP, MQTT, LWM2M for the resource, the property of the component that is associated with the requested resource in a translation table, or a bus command for querying or setting this property, and to query this property in the data transmission.

Thus, in the Internet of Things (IoT), it is possible to address bus components like any other IoT device via a URL address, and to control them with the same methods and commands. Here some or all of the properties of the components, such as the ability to control light intensity or color temperature, can be reached from the network as resources.

Additionally, the communication module may be designed to generate one or more data packets having information received from the component regarding the queried property, to determine a network address for the transmission of these data packets based on the received data, and to transmit the data packets to the determined network address. The communication module may generate an XML document or other document with the information received from the component, and transmit said document to the determined network address in response to the queried property/resource.

Alternatively or additionally, a translation table or a table entry may be associated with each component having at least one resource that can be queried, wherein the communication module is designed to determine, with the aid of the bus address (component ID) contained in the network address, the respective translation table or the corresponding table entry for determining the property to be queried.

The bus system may be a DALI bus in which at least one component may transmit a message designated as a "DALI Event Message" via the bus system, wherein the "DALI Event Message" data correspond to the aforementioned data autonomously generated by a component, and a "Callback URL" is associated with the "DALI Event Message," at which "Callback URL" an address may be stored to which the "DALI Event Message" or information/data contained in this message is then forwarded.

The bus system may use an "active low."

Alternatively or additionally, the communication module may be configured to detect as autonomously generated data at least one message sent by a component at a defined event to a defined bus address via the bus system, to determine a resource associated with the defined bus address and via this a network address, and to transmit the message to the defined network address. This allows a remote monitoring of components and/or activation of bus-external devices located in the network.

According to the present invention, a lighting system has a bus system, a plurality of components coupled to the bus system, and at least one of the communication modules described above.

According to the present invention, a method for transmitting data between at least one component coupled to a lighting bus system and a subscriber of an Internet protocol-based network, in which the bus system is coupled to the network via an interface, a unique bus address is associated with each component coupled to the bus system, a plurality of network addresses is associated with the interface, and at least one of the plurality of network addresses contains the bus address of a component, comprises the steps of:

receiving from the interface data transmitted from the network to the at least one network address, extracting the bus address of the component from the network address, determining the property of the component that is associated with the requested resource, determining data to be transmitted to the component with the extracted bus address based on the received data, and transmitting the determined data to the component with the extracted bus address, via the bus system.

Alternatively or additionally, at least one property of at least one component, which property can be queried in the bus system, may represent a resource accessible via the network which can be reached via a URL, wherein, if the received data contain an http request for the resource from a network subscriber, the following steps are executed in the method:

determining the property of the component that is associated with the requested resource in a table, receiving from the component information regarding the property queried in the data transmission, generating a data packet with the received information, determining a network address for the transmission of the data on the basis of the received data, and transmitting the data packet to the determined network address.

BRIEF DESCRIPTION OF THE DRAWINGS

The invention will be explained in more detail in the following using the accompanying drawings. Shown are.

DETAILED DESCRIPTION

Components having the same functions are identified by the same reference symbols in the figures.

Figure 1:
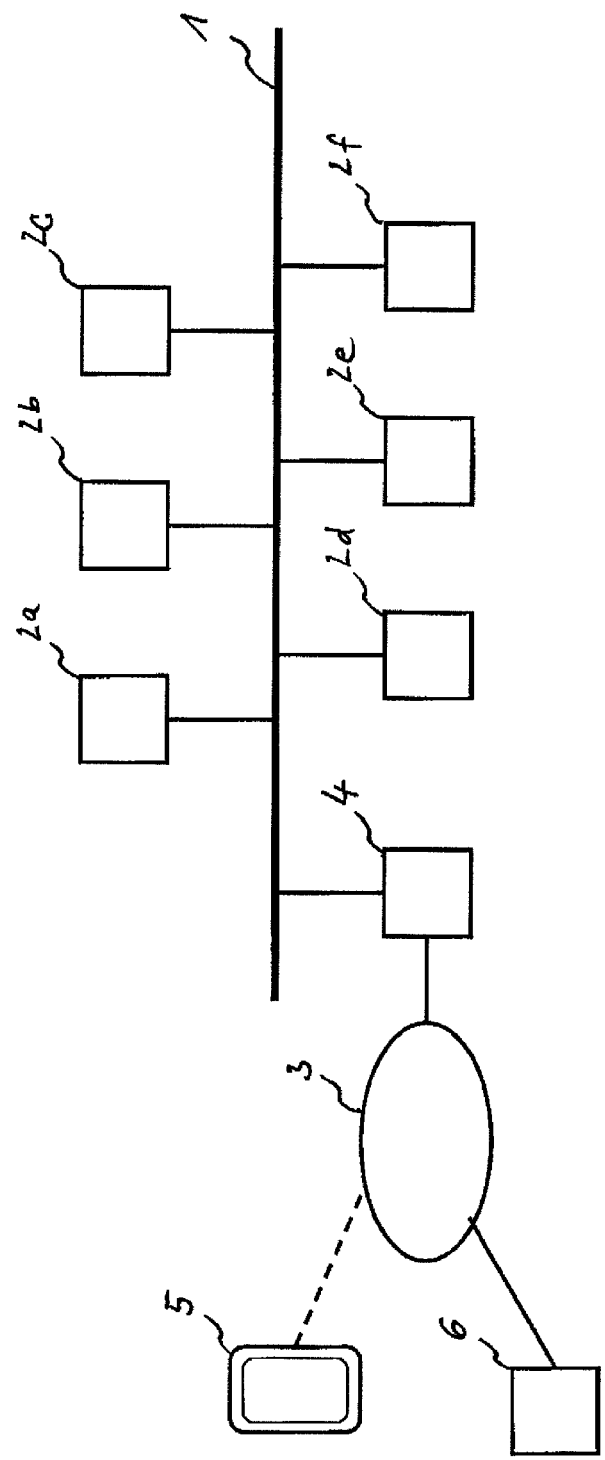
FIG. 1 a lighting system according to a first exemplary embodiment according to the present invention, FIG. 2 a simplified circuit of the communication module according to one embodiment according to the present invention, FIG. 3 a schematic presentation of a lighting system according to a second exemplary embodiment according to the present invention, FIG. 4 a simplified diagram to illustrate the method according to one exemplary embodiment, and FIG. 5 a simplified diagram to illustrate the method according to a further exemplary embodiment.

FIG. 1 shows the possible structure of a lighting system according to the present invention. The system has a data bus 1, a plurality of components 2a . . . 2f connected to the data bus 1, and a communication module 4 connected to the data bus 1 and to an internet-protocol-based network 3.

The data bus 1 may be a bus system according to the DALI industry standard, via which the components 2a . . . 2f, such as lamp operating devices, light sensors, movement sensors, pushbuttons, and control units, transmit control commands and operating data. According to the DALI 2 standard, sensors such as brightness sensors and motion sensors for activating lamp operating devices no longer need to be queried by a control unit, but can themselves send control commands to an operating device in order to switch on a lamp, for example. So that the lamp can be switched off again with a pushbutton coupled to the data bus 1 and likewise associated with said lamp, without the pushbutton needing to be actuated twice, the switch-on control command of the sensor or the operating state of the lamp may be communicated to the pushbutton via the data bus 1 by means of what is known as a "DALI Event Message," that is, a message about a defined event. In this way, the pushbutton may determine that the lamp is already lit and should not to be switched on but rather off at a button press.

The data bus 1 may utilize a bus system with an "active low" transmission. A power supply to connected components 2a . . . 2f, such as sensors, for example, is preferably possible via the data bus 1. The high level may be in the range of 12V-20.5V. For example, the bus system has a transmission speed of up to 1.2 kbits on the data bus 1.

The network 3 shown in FIG. 1 is a computer network in which payload data is sent in packets and in which, according to a layer model, control information of different network protocols is transmitted interleaved around the actual payload data in accordance with Internet Protocol Version 6 (IPv6).

A mobile control unit 5 can be connected to the network 3 via a communication link and serves to query status data and operating data of the components 2a . . . 2f, and to control at least some of the components 2a . . . 2f. The control unit 5 may be a smartphone, a personal digital assistant (PDA), or a tablet computer which can be coupled to the network 3 via a mobile communications connection or a local communications network (WLAN), and at which the status data and operating data may be queried and displayed by means of a graphical user interface, and at which control commands may be sent to the individual components 2a . . . 2f. Alternatively, of course, a non-mobile solution is also conceivable, for example a PC.

Also connected to the network 3 is a sensor 6 which may be located outside the building in which the data bus 1 is installed, and which transmits control commands to at least one component 2a . . . 2f via the network 3, the communication module 4, and the data bus 1. The sensor 6 may be a wind sensor which activates a drive of an awning as a component 2a . . . 2f.

The communication module 4 may be a gateway, and enables a transparent transmission of the control commands and queries from the control unit 5 and the sensor 6 to the desired component 2a . . . 2f. "Transparent" here means that at least some of the components 2a . . . 2f can be addressed by the control unit 5 and the sensor 6 via network addresses according to Internet Protocol Version 6 (IPv6), although within the data bus 1 each component 2a . . . 2f can only be addressed via its unique bus address/DALI address.

According to the present invention, a plurality of network addresses are associated with the communication module, wherein at least one of the plurality of network addresses contains the bus address (DALI address) of a component 2a . . . 2f.

The control unit 5 and the sensor 6 send their requests and control commands to the communication module 4, which extracts the bus address of the components 2a . . . 2f from the network address, if applicable converts the requests and control commands into DALI-compliant requests and control commands corresponding to the resource path, and transmits them to the components 2a . . . 2f with the extracted bus address. In the event of queries, the communication module 4 may determine the network address of the control unit 5 or of the sensor 6 from the data received by the control unit 5 or the sensor 6, and transmit the response to the query to the determined network address, said response being received via the data bus 1. In this way, at least some of the components 2a . . . 2f can be addressed like a network subscriber by the control unit 5 and the sensor 6.

Figure 2:
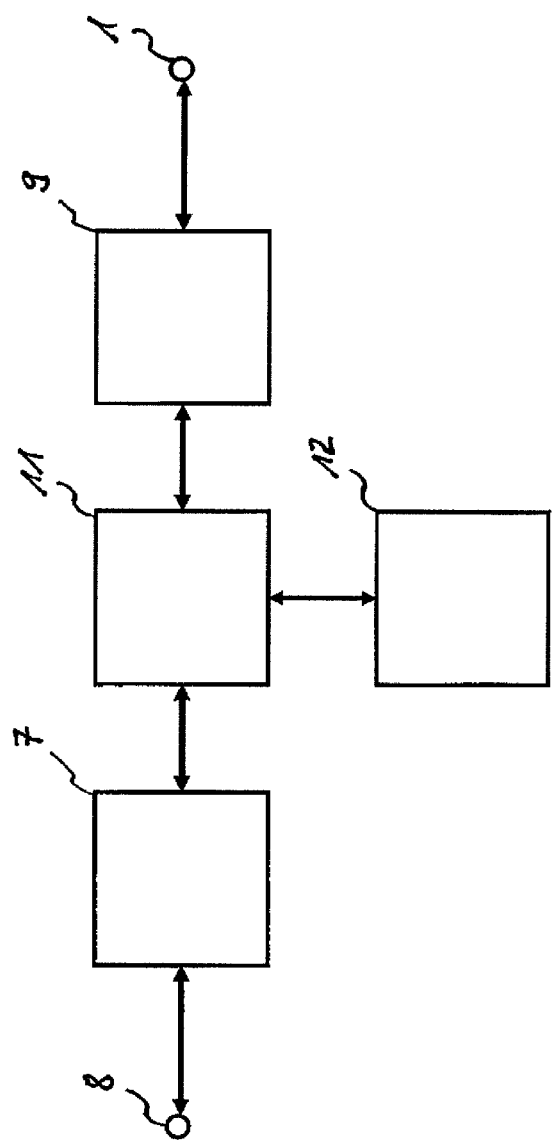

FIG. 2 shows a simplified circuit of the communication module 4 according to one exemplary embodiment according to the present invention. The communication module 4 shown in FIG. 2 has a network interface 7 which can be connected to the network 3 via a connection 8, a bus interface 9 which can be connected to the data bus 1, a control device 11, and a data memory 12.

The control device 11 extracts the bus address and/or the queries or control commands from the data received from the network 3 via the network interface 7, converts the queries or control commands into DALI-compliant queries and control commands by means of a table stored in the data memory 12, and transmits said queries and control commands via the bus interface 9 to the component 2a . . . 2f having the extracted bus address. A separate, unique bus address may be associated with the communication module 4, and the control device 11 may detect the data transmitted via the data bus 1 by means of the bus interface 9 and forward defined data and/or data transmitted to defined bus addresses to the control unit 5 and/or the sensor 6. For this purpose, special "Callback URL" resources are associated with defined data or defined bus addresses, with the aid of which network addresses may be stored or automatically calculated. Such a forwarding may be ordered by the control unit 5 and/or the sensor 6 with the aid of the "Callback URL" resources.

In the described example, only one control unit 5 and a sensor 6 are connected to the network or the communication module 4. However, a plurality of control units 5, sensors 6, or other devices, such as actuators, switches, or operating devices, may be connected to the network 3 or the communication module 4, even simultaneously.

The queries or control commands may be contained in the resource path of the access, in the data packets, or in the network address, and/or may already be DALI-compliant, so that no conversion and no data memory 12 are necessary in order to be able to transmit them via the data bus 1. The graphical user interface may be DALI-compliant, or be the graphical user interface of another control system.

According to the present invention, not only may a unique identifier (URI) be associated with the components 2a . . . 2f in the network 3, but also their queryable or adjustable properties, so that these properties are available via the network 3 or in the Internet of Things (IoT) as a resource/thing, and may possibly be linked to other resources/things.

Figure 3:
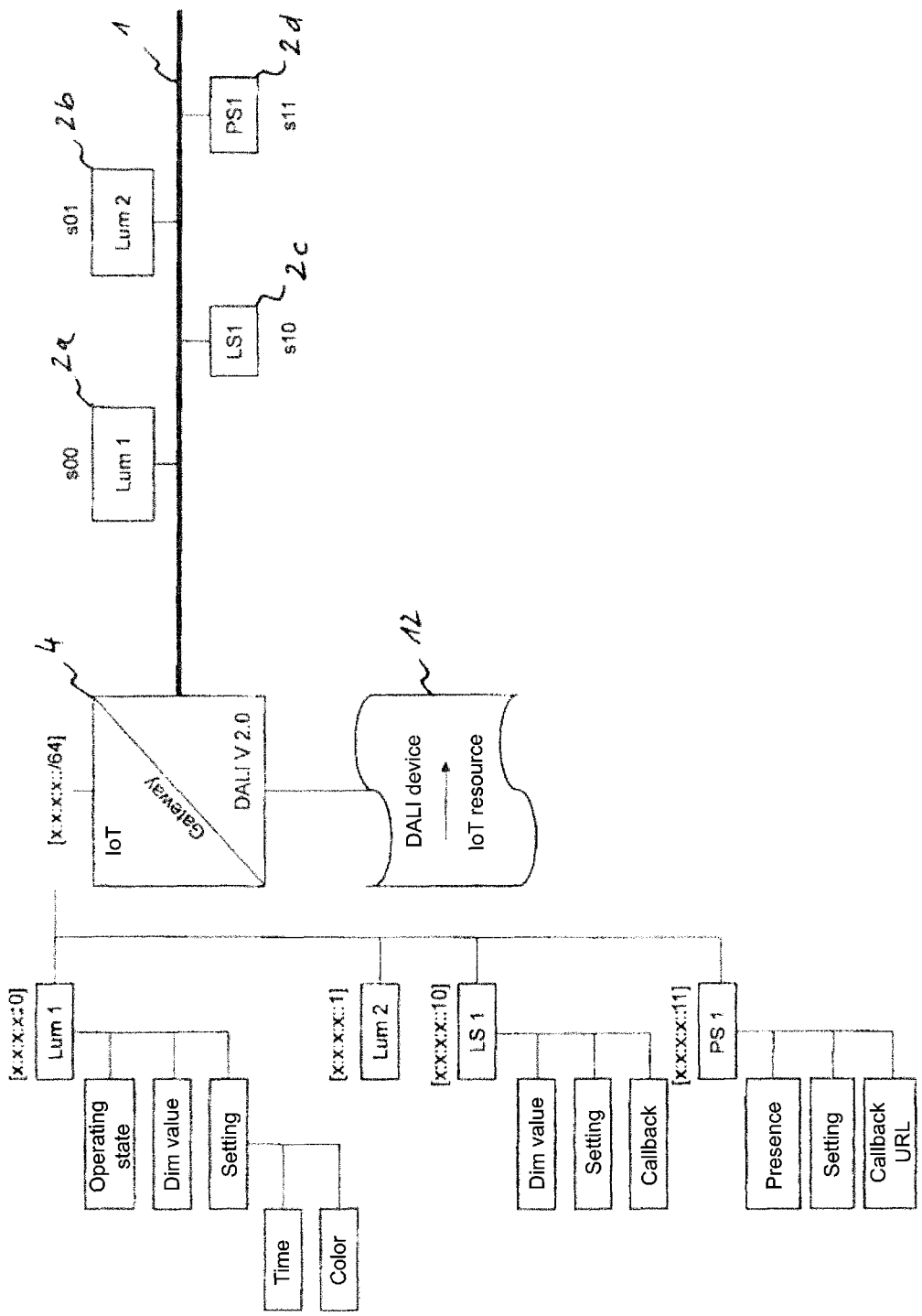

FIG. 3 shows a schematic representation of such a lighting system according to a second exemplary embodiment according to the present invention. In the case of the lighting system shown in FIG. 3, the communication module 4 connected to the network 3 (not shown) and the components 2a . . . 2f are coupled to the data bus 1, wherein the component 2a is a lamp "Lum 1" having the bus address s00, the component 2b is a lamp "Lum 2" having the bus address s01, the component 2c is a twilight sensor "LS1" having the bus address s10, and the component 2d is a motion detector "PS1" having the bus address s11.

The properties of components 2a . . . 2f which should be queryable and/or adjustable as resources via the network 4 are stored in a table stored in data memory 12 in the lighting system.

The resources/things of the lighting system shown in FIG. 3 that are available on the network side in the Internet of Things (IoT) are indicated with the network address on the left side next to the communication module 4 in a directory structure.

For the lamp "Lum 1," the resources "operating state", "dimming value," and the settings "time" (dimming speed) and "color" (color temperature) are available. The network address "x:x:x:x::0" is associated with the lamp "Lum 1," wherein the "0" corresponds to the bus address s00. The communication module 4 is a gateway to the subnet "x:x:x:x::/64" of the network 3, and may also have its own address in this subnet for configuration purposes.

The motion detector "PS1" may transmit as a property the "DALI Event Message" described above to a predetermined bus address, wherein in the IoT representation the "DALI Event Message" is forwarded to a "Callback URL," which can be set via the network via a corresponding resource.

The communication module is designed to automatically recognize the operating devices on the bus system 1. The services provided by the operating devices are translated into network resources by means of a translation table stored in the data memory 12. This also takes place automatically. These resources may be addressed via the network 3 in order to query data from the operating devices or to send commands to devices in order to thus change the configuration of said devices. The operating devices can thus be accessed transparently without specific commands needing to be known. The connected bus system 1 is thus also completely irrelevant for an access from the computer network.

The communication module is designed in such a way that information about the provided resources may be queried via a "generally known address." Via this path, an external device 5 may without prior knowledge determine all information about the bus system and the connected operating devices. This information is made available as hierarchically organized resource paths, wherein the data type for each resource may also be queried.

In the example of FIG. 3, four operating devices are connected as components 2a . . . 2d to the bus system 1 and have received a specific bus address (s00 . . . s11). The operating device scans the bus system and determines the types and addresses of the connected operating devices. The bus address in the bus system, e.g. s00 for device Lum1, is translated into an IPv6 address: x:x:x:x:x::0. The services provided by the operating devices 2a . . . 2d are then determined with the aid of the information stored in the data memory 12. These are translated into resource paths, e.g. /Settings/Color. The combination network address/resource path thus forms the URL via which a service of an operating device may be used. The current color value of Lum1 can be queried or changed, for example, via x:x:x:x:x::0/Settings/Color.

The communication module may be configured to perform an allotment of data sent from the network 3 to a plurality of DALI bus accesses, for example in the case of complex resources. In this way, there may be enabled complex resources such as a reset of the data bus 1, the readout of value tables of individual components or also of a plurality of components 2a . . . 2d, a performance of a firmware update for individual components or also a plurality of components 2a . . . 2d.

The communication module may be designed to perform a caching of data transmitted from the network 3. The communication module may also be designed to perform a verification of the data transmitted to the components 2a . . . 2f.

The network 3 may be designed such that the timeout for the protocol of the network 3 may also be of configurable design. For example, the communication module can be designed to determine the timeout parameter of the network 3 on the basis of the type of connected data bus 1, or on the basis of the number or also type of components 2a . . . 2f connected to the data bus 1.

With the aid of the invention, for example, different types of accesses to individual or also to a plurality of components 2a . . . 2d can be performed by means of an address translation, for example to individual (unicast), several (multicast), or the totality of components (broadcast).

Of course, the specified properties and resources are merely examples, and additional and/or different resources and properties may be defined following the same scheme.

Figure 4:
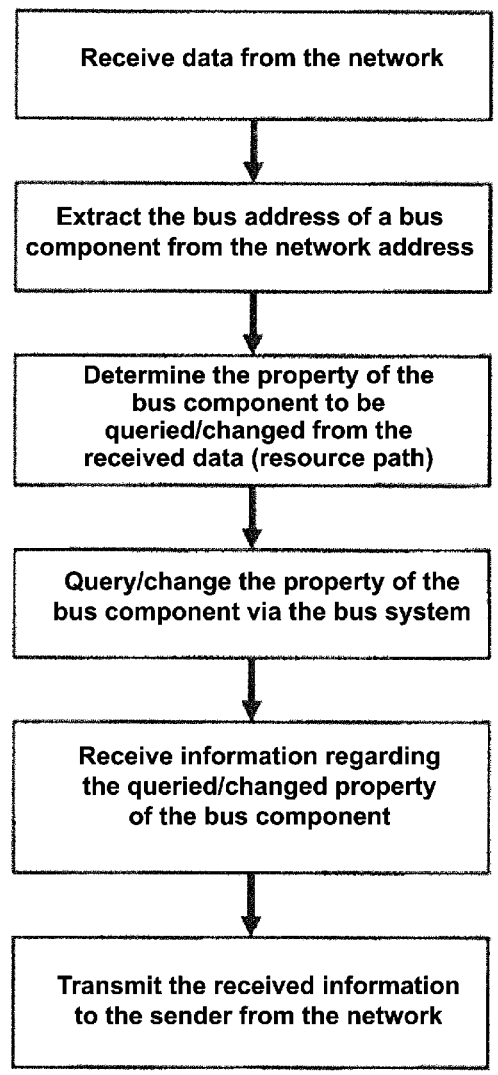

FIG. 4 shows a simplified diagram to present the method according to an exemplary embodiment in which the method steps already explained in the preceding are once again presented in a separate flowchart.

According to this exemplary embodiment, a method for transmitting data between at least one component 2a . . . 2f coupled to a lighting bus system and a subscriber of an internet-protocol-based network 3, in which the bus system is coupled to the network 3 via an interface, a unique bus address is associated with each component 2a . . . 2f coupled to the bus system 1, a plurality of network addresses is associated with the interface, and at least one of the plurality of network addresses contains the bus address of a component, has the steps of:

receiving from the interface data sent from the network to the at least one network address, extracting the bus address of the component 2a . . . 2f from the network address, determining the property (service) of the component associated with the requested resource (URL), with the aid of a translation table, determining data to be sent to the component 2a . . . 2f having the extracted bus address, based on the received data and the queried resource, and transmitting the determined data to the component 2a . . . 2f having the extracted bus address, via the bus system.

In this instance, a property of at least one component 2a . . . 2f, which property can be queried in the bus system, may represent a resource accessible via the network 3, which resource can be reached via a URL, the received data may include a request for the resource from a network subscriber 5, 6, and the method may have the following steps:

determining the property of the component 2a . . . 2f that is associated with the requested resource in a table, receiving, from the component 2a . . . 2f, information regarding the property that was queried in the data transmission, generating a data packet with the received information, and transmitting the data packet to the network address of the network subscriber 5, 6.

Figure 5:
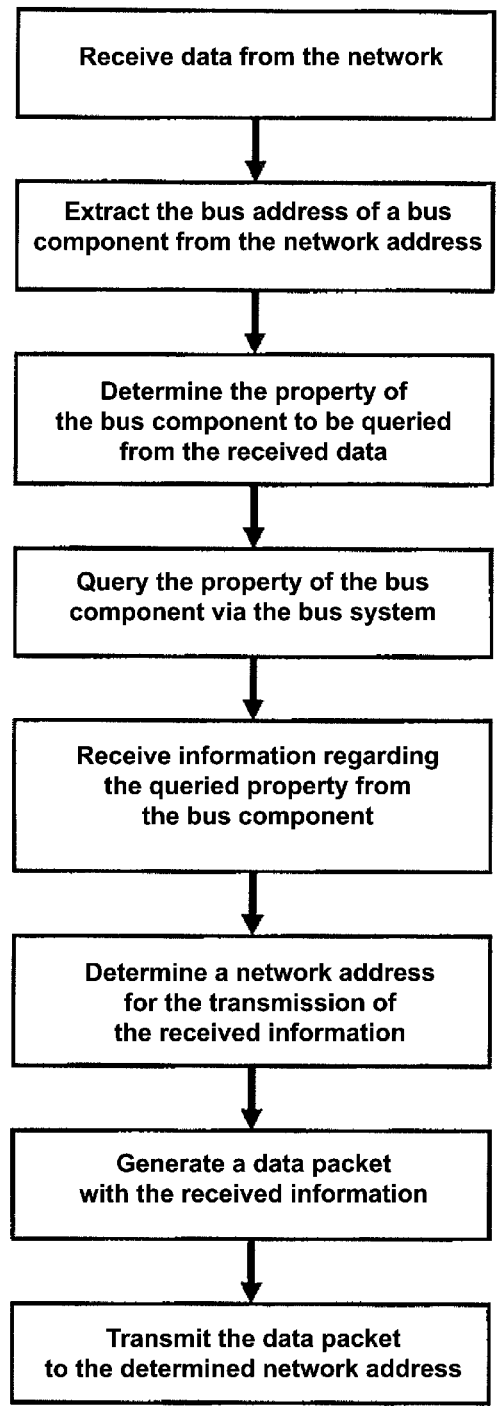

FIG. 5 shows a simplified diagram to present the method according to a further exemplary embodiment, in which the method steps already explained in the preceding are once again presented in a separate flowchart.

At least one property of at least one component, which property can be queried in the bus system, may represent a resource accessible via the network which can be reached via a URL, wherein, if the received data contain a request for the resource from a network subscriber, the following steps are executed in the method:

determining the property of the component that is associated with the queried resource, preferably in a table, receiving from the component information regarding the property queried in the data transmission, generating a data packet with the received information, determining a network address for the transmission of the data on the basis of the received data, and transmitting the data packet to the determined network address.

What is claimed is:

1. A communication module for connecting a DALI lighting bus system (1) to a network (3) based on the IPv6 protocol, the communication module comprising:
   a control device;
   a data memory;
   a network interface configured to be connected to a network according to the IPv6 network protocol;
   a bus interface (9) configured to be connected to a DALI (Digital Addressable Lighting Interface) data bus (1) to which one or more components (2a . . . 2f) are coupled;
   wherein a unique DALI bus address is associated with each component (2a . . . 2f) coupled to the data bus (1),
   at least one property of the at least one component (2a . . . 2f) coupled to the DALI data bus (1) is capable of being queried and represents a resource accessible via the network (3), wherein said resources are stored in a table in the data memory,
   a plurality of network addresses in the form of IPv6 addresses or universal resource locators (URLs) are associated with the communication module (4),
   at least one of the plurality of network addresses contains the DALI bus address of a component (2a . . . 2f) coupled to the DALI data bus;
   wherein the communication module (4) is configured to receive data transmitted to the at least one network address from the network (3) via the network interface, to extract the DALI bus address of the component (2a . . . 2f) from the network address, to determine data to be transmitted to the component (2a . . . 2f) by using the extracted DALI bus address on the basis of the resource and/or the received data, and to transmit the determined data to the component (2a . . . 2f) having the extracted DALI bus address via the bus interface and the DALI data bus (1), and to provide data generated autonomously by a component (2a . . . 2f) and transmitted to the communication module (4) to at least one network subscriber via the network (3); and
   wherein the at least one component (2a . . . 2f) is capable of transmitting a DALI Event Message via the DALI bus system, and a callback internet address for the network subscriber to which the DALI Event Message or its translation is to be forwarded is stored as a resource in the table in the data memory of the communication module.

2. The communication module according to claim 1, wherein the communication module (4) is designed to extract the address of the component (2a . . . 2f) from the interface identifier of the network address based on Internet Protocol Version 6.

3. The communication module according to claim 2, wherein in the bus system, a plurality of components (2a . . . 2f) may be addressable by means of a group bus address, and the communication module (4) is designed to determine the group bus address on the basis of a multicast address contained in the network address, and to implement a data transmission to the components (2a . . . 2f) belonging to the determined group bus address on the basis of the received data and/or resource.

4. The communication module according to claim 1, wherein the communication module (4) is designed to determine a control command from the received data, and to transmit the determined control command to the component (2a . . . 2f) with the extracted bus address or the components (2a . . . 2f) with the determined group bus address.

5. The communication module according to claim 1, wherein the communication module (4) is designed to perform a conversion of the data packet format of the received data into the data packet format of the bus system as a transparent gateway, at least from the viewpoint of the network (3).

6. The communication module according to claim 1, wherein said at least one property of at least one component (2a . . . 2f) can be reached via a URL, and the communication module (4) is designed such that the received data contain a query of the resource to determine the property of the component (2a . . . 2f) associated with the requested resource in a translation table, and to query the property in the data transmission.

7. The communication module according to claim 6, wherein the communication module (4) is designed to generate a data packet having information received from the component regarding the queried property, to determine a network address for the transmission of the data packet based on the received data, and to transmit the data packet to the determined network address.

8. The communication module according to claim 6, wherein the translation table is associated with each component (2a . . . 2f) having at least one queryable resource, which translation table associates at least one property that can be queried by the component (2a . . . 2f) with the resource which can be queried on the network side, and the communication module (4) is designed to determine the at least one property to be queried for the queried resource by means of the translation table.

9. The communication module according to claim 6, wherein the communication module (4) is designed to detect at least one message transmitted by a component (2a . . . 2f) to a specific bus address via the bus system (1) regarding a specific event, to determine a network address associated in a table with the specific bus address, the specific event, and/or the message, and to transmit the message to the specific network address.

10. A lighting system having a bus system, a plurality of components (2a . . . 2f) coupled to the bus system (1), and the communication module (4) according to claim 1.

11. A method for transmitting data between at least one component (2a . . . 2f) coupled to a DALI (Digital Accessible Lighting Interface) lighting bus system (1) and a subscriber (5, 6) of a network (3) based on an IPv6 internet protocol, wherein
the DALI bus system (1) is coupled to the network (3) via a communication module (4),
a unique DALI bus address is associated with each component (2a . . . 2f) coupled to the DALI bus system (1),
at least one property of the at least one component (2a . . . 2f) coupled to the DALI data bus (1), wherein the at least one property can be queried in the DALI bus system (1) and represents a resource accessible via the network (3),
a plurality of network addresses are associated with communication module,
at least one of the plurality of network addresses contains the DALI bus address of a component (2a . . . 2f) on the DALI data bus, and the method comprises the steps of:
receiving from the communication module (4) data transmitted from a subscriber on the network to the at least one network address containing the DALI address of a component on the DALI data bus,
extracting the DALI bus address of the component (2a . . . 2f) from the network address,
determining the property of the DALI component associated with the requested resource, with the aid of a translation table,
determining data to be sent to the component having the extracted bus address, based on the received data and the resource, and
transmitting the determined data to the DALI component with the extracted DALI bus address, via the DALI bus system.

12. The method according to claim 11, wherein
the resource accessible via the network (3) can be reached via an internet address,
the received data include a request for the resource from a network subscriber (5, 6), and the method comprises the following steps:
determining the property of the DALI component (2a . . . 2f) that is associated with the requested resource in a table,
receiving, from the DALI component (2a . . . 2f), information regarding the property that was queried in the data transmission via a DALI Event Message from the DALI component transmitted on the DALI data bus,
generating a data packet with the received information,
associating the data packet with a callback internet address for the network subscriber, said callback network address for the network subscriber being stored in a table in the memory of the communication module; and
transmitting the data packet to the callback network address of the network subscriber (5, 6).

* * * * *